Figure 1:
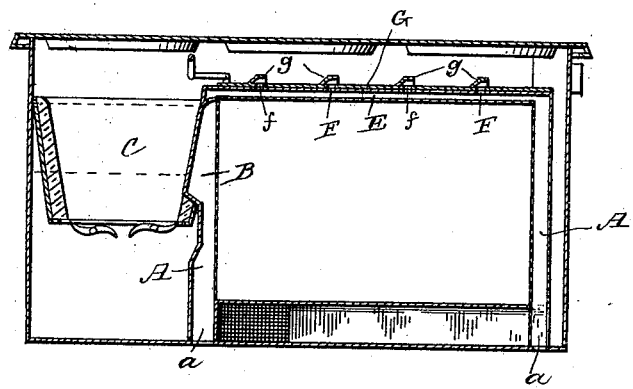

(No Model.) 2 Sheets—Sheet 1.

J. A. PRICE.
COOKING STOVE OVEN.

No. 418,817. Patented Jan. 7, 1890.

Witnesses
E. L. Smith
Thomas Durant

Inventor
John A. Price
by Church & Church
his Attorneys (No Model.) 2 Sheets—Sheet 2.

J. A. PRICE.
COOKING STOVE OVEN.

No. 418,817. Patented Jan. 7, 1890.

Witnesses
E. D. Smith
Alex J. Stewart

Inventor
John A. Price
By his Attorneys
Church & Church

N. PETERS, Photo-Lithographer, Washington, D. C.

UNITED STATES PATENT OFFICE.

JOHN A. PRICE, OF SCRANTON, PENNSYLVANIA.

COOKING-STOVE OVEN.

SPECIFICATION forming part of Letters Patent No. 418,817, dated January 7, 1890.

Application filed March 12, 1889. Serial No. 302,952. (No model.)

*To all whom it may concern:*

Be it known that I, JOHN A. PRICE, of Scranton, in the county of Lackawanna and State of Pennsylvania, have invented certain new and useful Improvements in Ventilating Cooking-Stove Ovens; and I do hereby declare the following to be a full, clear, and exact description of the same, reference being had to the accompanying drawings, forming a part of this specification, and to the letters of reference marked thereon.

In all classes of cooking-stoves it is found of great advantage to properly ventilate the oven in which the cooking operation is performed in order to remove the vapors and gases rising from the articles being cooked, and to afford a fresh supply of hot air, which, by being kept in circulation by the air passing into and out of the oven, as well as the natural circulation within the oven, aids materially in the cooking operation.

Various attempts have heretofore been made to construct properly-ventilated ovens; but the ovens so constructed have been found inefficient, and at the present time comparatively few ovens are manufactured which are ventilated by the admission of fresh air and allowing the vitiated air to escape. One of the causes of the failure of such ovens is because the air for ventilating is passed directly through the body of the oven and around the articles being cooked, and necessarily, being of a somewhat lower temperature than the air passing out, detracts greatly from the efficiency of the oven.

My present invention is designed to obviate the defects pointed out and provide a ventilated oven in a cook or other stove, which can be manufactured at a minimum cost and will combine the greatest simplicity with the maximum efficiency and economy in the consumption of fuel.

With these ends in view the invention consists in an oven having air passages or ducts arranged along the sides of the oven, preferably in the corners, with air-entrance ports at one end and discharge-ports at the opposite end, which ducts permit the free and natural circulation constantly going on in the oven to cause the air to enter or pass out of the duct into the oven; and, further, the invention consists in certain novel details of construction and combinations and arrangements of parts, to be hereinafter described, and pointed out particularly in the claims at the end of this specification.

Figure 2:
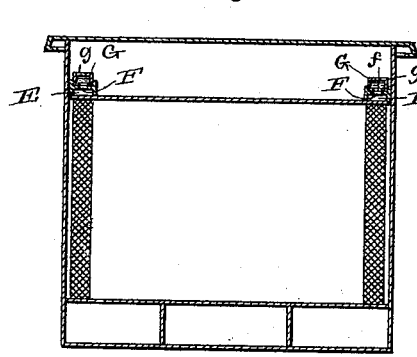
Figure 3:
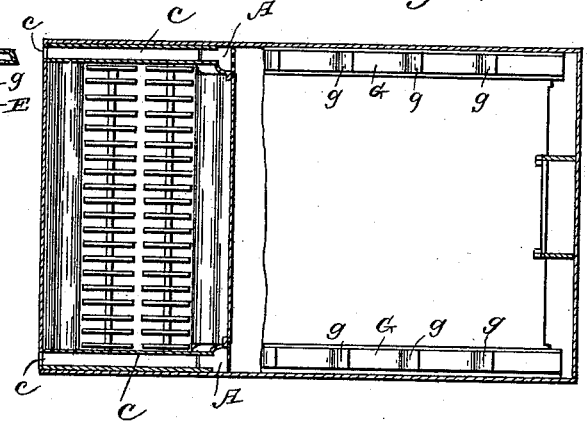
Figure 4:
Figure 5:
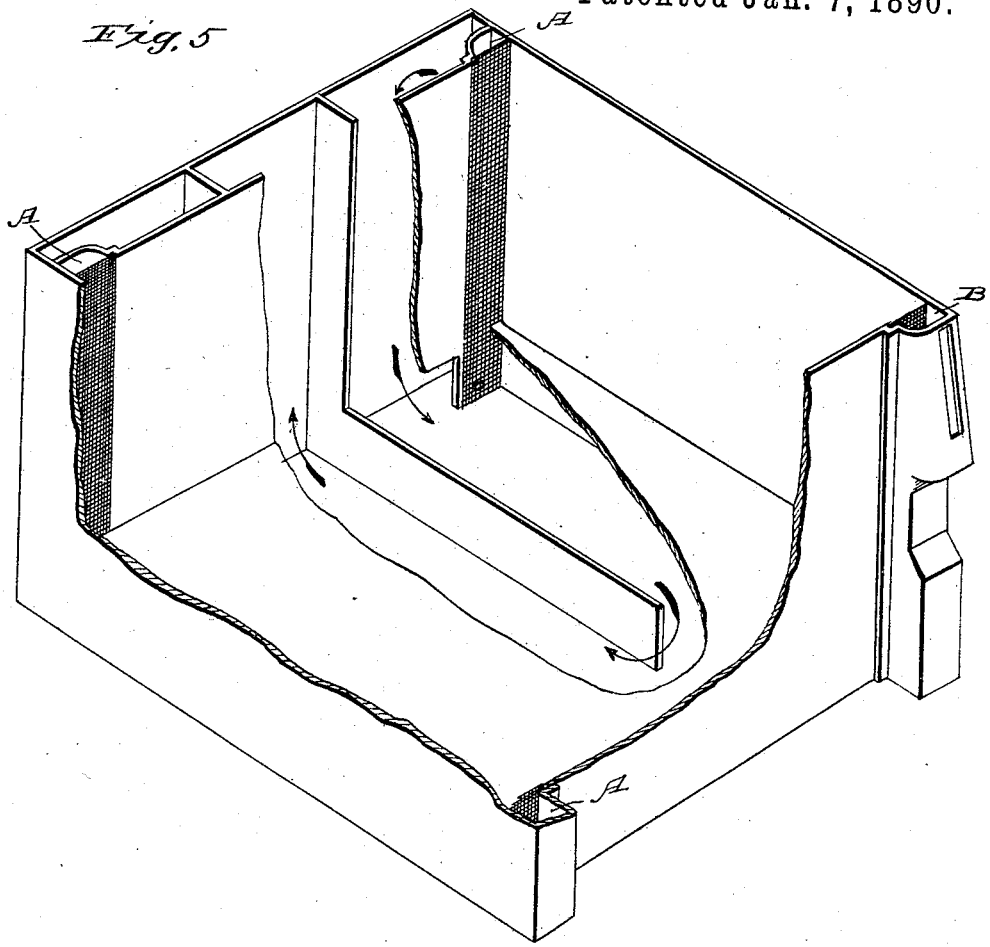
Figure 6:
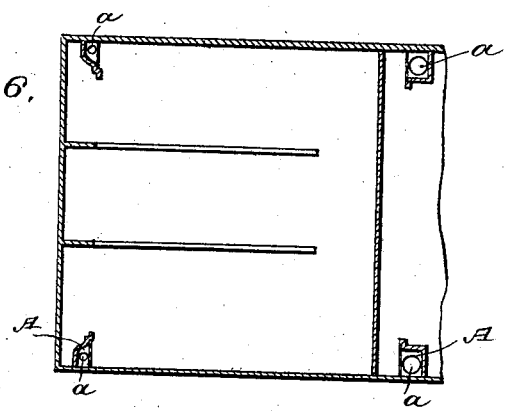

In the accompanying drawings, Figure 1 is a longitudinal sectional view of a stove constructed in accordance with my invention. Fig. 2 is a section at right angles to Fig. 1, looking toward the front of the stove. Fig. 3 is a horizontal section through the fire-pot. Fig. 4 is a similar section of the oven-plate, showing the corner recesses forming the ducts. Fig. 5 is a perspective view of the oven with the entire top and fire-pot removed and one wall broken away. Fig. 6 is a horizontal section below the oven. With these views the invention cannot fail to be understood.

Similar letters indicate the same parts.

The ducts or air-passages are preferably located in each corner of the oven, as at A A A A, with small air-inlets *a a a a* at the lower end opening below the stove and with suitable discharge-openings at the top, preferably opening into the smoke-flue in a manner to be presently described. Said ducts A are preferably formed by making recesses at the edges of the end plates of the oven, as shown, and locating over such recesses foraminous plates formed either of wire-gauze or thin perforated metal of any preferred character. The ducts at the forward end are somewhat modified to obtain the full benefit of the heat from the fire-pot, being for this purpose formed into chambers B opposite the fire-pot, the front wall of which chambers may be interposed between the fire-bricks at the corners of the fire-pot and exposed to the direct action of the fire, as shown, thus highly heating the air within the ducts.

As a further means of utilizing the heat from the fire-pot, I may form the end walls C hollow, as shown in Fig. 3, with openings *c* in the front of the stove and openings at the rear into the ducts A, giving an increased supply of very hot air in the ducts at the corners and preventing all liability of cooling the oven by the admission of cold or relatively cold air.

Arranged at the top of the oven are ducts E, one on each side, preferably connecting the front and rear ducts A, and provided with eduction-openings F at the top, opening into the smoke-flue, and with the slide-valves G for covering the eduction-openings. The slide-valves have apertures $f$ therein corresponding to the aperture F, and over each aperture $f$ is placed a hood or cap $g$ open only on the side toward the rear of the stove. Thus when the apertures F and $f$ register to permit the heated air to escape there is little or no danger of smoke from the flue entering the oven, the smoke passing, as it does, past the openings in the caps tending rather to draw the air out of the ducts than to force the smoke in.

The rear ducts may, if desired, be foraminous on one side below the oven and within the smoke-flue at this point, as shown, the open side of course being turned in the direction in which the smoke is moving, thus affording an additional outlet for the vitiated air.

The covering for the ducts may be of any preferred foraminous material—such as wire-gauze or plates cast with apertures in the same—or, where the recess is deep enough to form a well-defined flue, the ducts may be left open entirely on the side next the oven without danger of causing a discharge of cold air through the center thereof, as the current of air will be straight through the duct.

In operation, the air entering the ducts tends to pass through and out, but a portion is disseminated throughout the oven by the natural circulation of the heated air within the oven, the hot and vitiated air entering the ducts in the upper part and passing out and the purer air passing out of the ducts in the lower part; but in no case is a current of air caused to travel through the center of the oven or through the space in which the articles to be cooked are placed unless a current is set up by the natural circulation within the oven, and such current would not tend to cool the articles being cooked. From the duct over the top of the oven the vitiated air and air passing through the ducts escapes into the smoke-flues when the dampers are open, and when such dampers are closed, as may be readily done by handle H, a circulation will be set up in the oven around through the duct above the oven, thus drawing the heat from the products of combustion passing through the smoke-flue and disseminating the same throughout the oven from top to bottom.

The details of construction may be greatly changed and varied without departing from the spirit of this invention, and the idea of passing a current of air past the oven embodied in many other structures, and I do not, therefore, wish to be limited herein to the specific structure set forth.

Having thus described my invention, what I claim as new is—

1. In a cooking-stove, the combination, with a fire-pot and oven, of a heating-flue exposed on one side to the fire in the fire-pot having a foraminated side next the oven and a flue above the oven, and an inlet-opening at the lower end communicating with the aforesaid heating-flue and provided with discharge-openings above the oven, substantially as described.

2. In a cooking-stove, the combination, with the fire-pot, smoke-flue, and oven, of a heating-flue exposed on one side to the fire in the fire-pot and having a foraminated side next the oven and a flue above the oven communicating with the aforesaid heating-flue and provided with discharge-openings leading into the smoke-flue, substantially as described.

3. In a cooking-stove, the combination, with the fire-pot and oven, of an air-heating flue exposed on one side to the fire in the fire-pot and having a foraminated side next the oven, a flue above the oven communicating with the aforesaid heating-flue and provided with discharge-openings, and an air-heating flue at the rear of the oven having a foraminate side next the latter and also communicating with the said upper flue, substantially as described.

4. In a cooking-stove, the combination, with the fire-pot, smoke-flue, and oven, of an air-heating flue exposed on one side to the fire in the fire-pot and having a foraminated side next the oven, a flue above the oven communicating with the aforesaid heating-flue and provided with discharge-openings into the smoke-flue, and an air-heating flue at the rear of the oven having a foraminous side next the latter and also communicating with the said upper flue, substantially as described.

5. In a cooking-stove, the combination, with the fire-pot, smoke-flue, and oven, of air-heating flues at the corners of the oven exposed on one side to the fire in the fire-pot and having foraminous sides next the oven, flues at the upper corners of the oven discharging into the smoke-flue, and communications between said last-mentioned flue and the air-heating flue, substantially as described.

6. In a cooking-stove, the combination, with the fire-pot, smoke-flue, and oven, of air-heating flues at the forward corners of the oven exposed on one side to the fire in the fire-pot and having foraminous sides next the oven, air-heating flues at the rear corners of the oven having foraminous sides next the oven, and flues above the oven communicating with the air-heating flues at the front and back of the oven with discharges from said last-mentioned flues into the smoke-flues, substantially as described.

7. In a cooking-stove, the combination, with the fire-pot and oven, of the air-heating flue exposed on one side to the fire in the fire-pot and having the foraminous side next the oven, the inlet-flues passing in proximity to the fire-pot and opening into said air-heating flue, and the flue above the oven communicating with the air-heating flue with discharge-openings into the smoke-flue, substantially as described.

8. In a cooking-stove, the combination, with the air-heating flue having the foraminated side next the oven and the flue above the oven communicating with said air-heating flue and discharging into the smoke-flue, of the dampers controlling said discharge-opening, substantially as described.

9. In a cooking-stove, the combination, with the air-heating flue having the foraminated side next the oven and the flue above the oven communicating with said air-heating flue and discharging into the smoke-flue, of the dampers controlling said discharge-openings with their openings toward the rear of the stove, substantially as described.

10. In a cooking-stove, the combination, with the oven having an air-inlet, of the flue above the oven and the flue at the rear of the oven communicating with the said first-mentioned flue, and having the foraminous side next the oven, whereby the circulation in the oven is promoted, substantially as described.

11. In a cooking-stove, the combination, with the oven having an air-inlet, of the flues above the oven communicating therewith at the front and the flues at the rear corners of the same communicating with said first-mentioned flues at the rear, and having the foraminous sides next the oven, whereby the circulation in the oven is promoted, substantially as described.

12. In a cooking-stove, the combination, with the fire-pot and oven, of an air-heating flue exposed on one side to the fire in the fire-pot and having an inlet-opening, an air-flue above the oven communicating therewith at the rear end, and a communication between the opposite end and the aforesaid air-heating flue, substantially as described.

13. In a cooking-stove, the combination, with the fire-pot and oven, of the substantially-vertical air-heating flues at the front corners of the oven for the inlet of air exposed on one side to the action of the fire in the fire-pot and open on the opposite side throughout the portion exposed in the oven, whereby the air is permitted to circulate freely along and in and out of said flues, substantially as described.

JOHN A. PRICE.

Witnesses:
THOMAS DURANT,
MELVILLE CHURCH.